Patented July 21, 1953

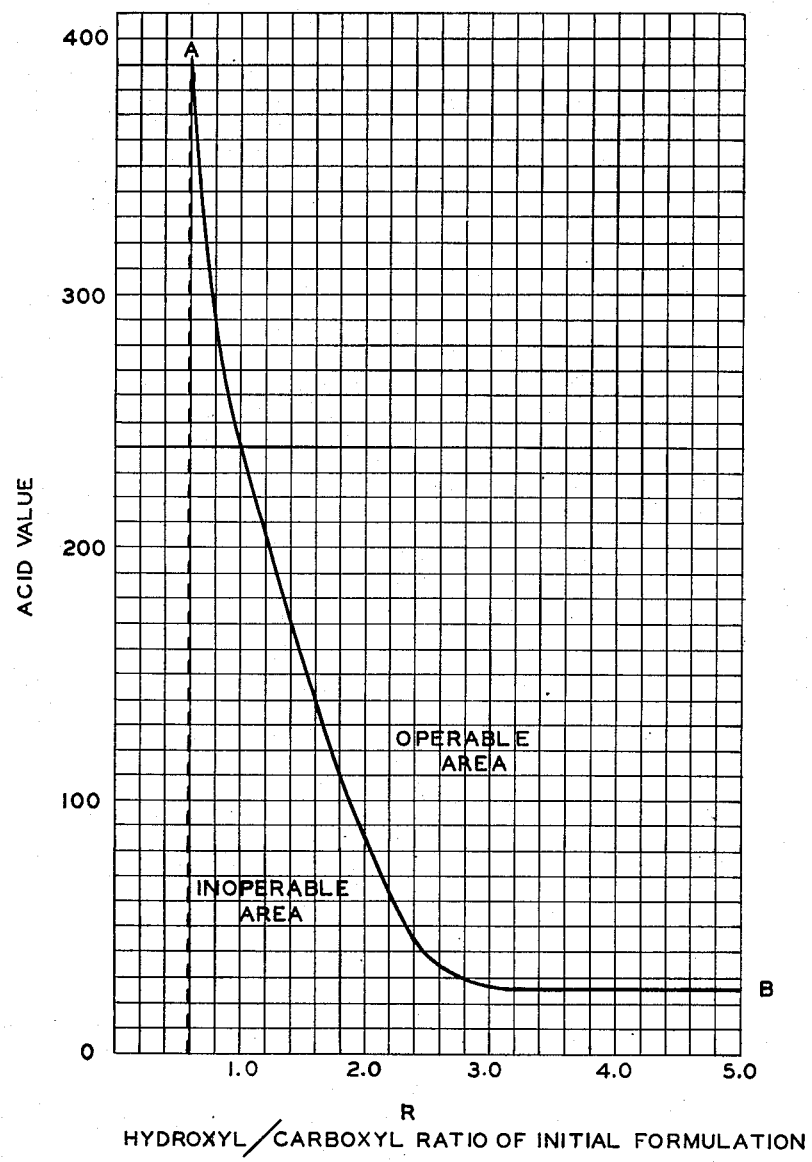

2,646,410

UNITED STATES PATENT OFFICE 2,646,410

MALEIC POLYESTER COMPOSITIONS

Joseph Wayne Kneisley, Marshallton, Del., assignor to Hercules Powder Company, Wilmington, Del., a corporation of Delaware Application May 3, 1949, Serial No. 91,062

10 Claims. (Cl. 260—29.2)

This invention relates to aqueous solutions of reaction products of a polyhydric alcohol and an α,β-unsaturated dicarboxylic acid. It further relates to aqueous solutions of such reaction products which can be converted to the insoluble infusible state by the application of heat. It still further relates to coating or impregnating compositions containing any of the aforesaid aqueous solutions.

Reaction products of the type designated above, assuming reaction has taken place to the extent required to give rise to the resinous state, are known to the art as unmodified alkyd or polyester resins.

Various attempts have been made by the art to apply alkyl resins via water solutions or dispersions thereof. The advantages of the use of water are substantial. Not only is the expense of organic solvents eliminated; but the use of water makes it possible to apply the resins at high temperatures which would cause a fire hazard in the presence of inflammable organic solvents. Unfortunately, however, the prior art attempts to use water as the solvent or carrier have not been entirely successful.

One device for using water as the carrier has been to first prepare an alkyd resin of rather high acid value and then solubilize the same in water by the use of ammonia, inorganic bases such as NaOH, KOH, etc. as well as water-soluble organic bases such as the ethanolamines. This device has its disadvantages due to the fact that the alkaline solubilizing agents that cannot be volatilized lower the water-resistance of the ultimate film, whereas the volatile alkaline solubilizing agents seriously affect the speed of convertibility of films containing the same.

It has been sought to avoid the introduction of the aforementioned reagents by using as the polyhydric alcohol in the resin-forming reaction an alcohol containing a number of ether groups such as hexaethylene glycol, reliance being placed on the ether groups to provide water-solubility. Although the resins resulting from the application of this concept are soluble in water at high concentrations of resin, such resin solutions will not stand substantial dilution with water to provide the low concentrations which would be desirable either for technical reasons relating to application or for sake of economy. Among the other disadvantages of this type of resin is the tendency toward water-sensitivity due to the large number of ether groups present. Other methods for using water as a carrier have involved emulsification of the alkyd in water. These methods have been uniformly unsatisfactory due to the fact that the agents introduced to effect emulsification or dispersion disadvantageously affect the properties of the ultimate film.

In accordance with this invention there are now provided compositions wherein water is very effectively employed as the carrier for an alkyd or polyester resin. In these compositions the resin is truly soluble in the water and is not emulsified therein or dispersed therein in the form of discrete particles. Furthermore, no alkaline solubilizing agents are required to take the resin into solution, nor are any other reagents required.

In preparing the aqueous solutions of this invention, it is necessary to take into account a number of different factors. These factors relate either to (1) the nature and proportions of the reactants which are employed or (2) the extent of reaction. The products which are employed in forming the aqueous solutions are either in the resinous state at the time of their employment or they are incipient resins. In view of the fact that it is difficult to draw the line of demarcation between such products, they will be referred to hereinafter simply as "reaction products."

The reaction products which are used in accordance with this invention are those obtained by partially esterifying a polyhydric alcohol and maleic acid or anhydride. Although the invention will be described hereinafter with respect to maleic acid, it will be understood that maleic anhydride may be employed equivalently therefor. The polyhydric alcohol must be an alcohol having from 2 to 6 inclusive hydroxyl groups per molecule or mixtures thereof. The polyhydric alcohol employed must contain no oxygen except that in the form of hydroxyl groups. Furthermore, it must have an OH/C ratio of 0.6 to 1.0, inclusive. (OH/C ratio as used herein means the ratio of the number of hydroxyl groups to the number of carbon atoms contained in a given compound.)

In preparing the subject reaction products, the reactants, polyhydric alcohol and maleic acid, may be used in various proportions. They must, however, be employed in such proportions as to provide a heat-convertible reaction product, i. e., one which when heated in the presence of air at a temperature below its decomposition temperature will become insoluble and infusible. The proportions required are within the skill of the art here involved. This aspect of the invention will be discussed in some detail hereinafter.

The useful reaction products, in accordance with this invention, are those having at least half of the carboxyl groups (actual or potential) originally presented by the reactants esterified as evidenced by the acid value of the reaction product but at the same time having an acid value of at least the minimum value for the particular OH/COOH ratio employed as defined by line A—B of the figure. The OH/COOH ratio as used herein means the ratio of the number of hydroxyl groups to the number of carboxyl groups (actual or potential) in the initial formulation and is referred to as R hereinafter.

The figure represents a relationship between OH/COOH ratio and acid value for the reaction products with which this invention is concerned. The abscissa represents various values of OH/COOH ratio, whereas the ordinate represents various values of acid value. The curve AB represents the locus of minimum values of acid value which obtain from various OH/COOH ratios. Thus, for example, at OH/COOH ratio of 2.0 the minimum acid value which provides a reaction product which is operable in the sense of this invention is 85.

These reaction products in the form of their aqueous solutions constitute the subject invention. Not only can these reaction products be dissolved in water with ease without the aid of alkaline solubilizing or other agents, but the resulting aqueous solutions can be diluted with water to the extent of providing aqueous solutions of 15% or less concentration. This property is indeed unique, and it is very important in many industrial applications. Thus, solutions of very low viscosity can be prepared which are easily applied by spraying, etc. Furthermore, by adjusting the concentration of the solution no more resin than is necessary need be applied to the object being coated or impregnated. Hence, the subject solutions make for economy of operation.

Another important characteristic of the subject aqueous solution lies in their ability in the form of thin films to be heat-converted with ease to the insoluble, infusible state. No oxidation or peroxide-type polymerization catalysts are needed, although they may be used, if desired. The cured reaction products evidence remarkable flexibility. They are further characterized by light color and excellent color stability. The cured products are extremely water resistant. In this respect in particular they represent a substantial improvement when compared with the cured products resulting from the prior art methods of utilizing alkyd or polyester resins in aqueous media.

Having described the generic aspects of this invention, the following specific examples are given as specific embodiments thereof. These specific examples are not, however, to be construed as limiting the invention.

Example 1

Four hundred ninety grams (10 equivalents) of maleic anhydride, 155 g. (5 equivalents) of ethylene glycol and 786 g. (21.2 equivalents) of pentaerythritol were charged in a three liter flask equipped with a thermometer, carbon dioxide sparge tube, stirrer, and a steam heated reflux condenser. The pentaerythriotol used in this and the following examples was a technical grade having an equivalent weight of 37. The OH/COOH ratio of this charge was 2.63. The mixture was agitated and water was added until a fluid slurry was obtained. Five hundred thirty-seven grams of water were so used. The flask was flushed out with carbon dioxide and the mixture was heated to 150° C. After 9 hours of reaction the acid value of the product was 36. At this point water was poured into the resin in the flask to provide a 36% solution. This 36% solution was further diluted with water to 15% solids, at which concentration the solution remained perfectly clear. The 15% aqueous solution was sprayed on an aluminum plate to provide a film of 5-mils thickness and the film was cured to the insoluble infusible state by heating at 200° C. for 10–12 minutes. This solution was also sprayed on glass wool fibers which were thereafter compressed in the form of a bat suitable for insulation and cured to the insoluble, infusible state at 200° C. The resulting bats proved to possess good water-resistance and resilience. The cured resin functioned well as a binder for the glass wool fibers.

Example 2

Four hundred ninety grams (10 equivalents) of maleic anhydride were heated under a blanket of nitrogen in the equipment employed in Example 1 and 743 g. (20 equivalents) of pentaerythritol were added with agitation. To this slurry was added 155 g. (5 equivalents) of ethylene glycol. The OH/COOH ratio of this charge was 2.5. The mixture was heated to 150° C. and heating continued until an acid number of 112 was obtained. This resin was readily water-soluble and dilutible to 15% concentration in water. Films of the 15% aqueous solution were readily converted to the insoluble, infusible state by heating in an oven at 200° C. for approximately 10 minutes.

Example 3

One hundred eighty-four grams of glycerol, 124 g. of ethylene glycol and 306 g. of maleic anhydride were charged into a three liter flask and agitated to provide a slurry. The OH/COOH ratio of the reactants in this case was 1.60. The slurry was heated to 150° C. and maintained at that temperature until a product having an acid value of 140 was obtained. This resin dissolved easily in water with stirring, and the resulting aqueous solution could be diluted with water to 15% solids without any evidence of precipitation of the resin. The films of the 15% solution could be easily cured at 200° C. to the infusible insoluble state. A portion of the resin which was not dissolved in water was reacted further to provide a product having an acid value of 131. This product did not possess the desirable water solubility and dilutibility properties possessed by the resin of acid value 140.

Example 4

A reaction product was prepared from pentaerythritol and maleic anhydride using the procedure previously described in Example 1. Five hundred forty-two grams of pentaerythritol and 955 g. of maleic anhydride were employed, providing an OH/COOH ratio of 0.75. At the point the reaction product had an acid value of 346 it was found that it could be dissolved in water and diluted to concentrations of 15% solids or lower. Furthermore, films of such solutions were readily convertible by heating to an insoluble and infusible state. Upon further heating of the reaction product to provide a product of acid value 300, it was found that the desirable properties of water solubility and dilutibility no longer obtained.

Example 5

The same ingredients as those employed in Example 4 were used, except that they were used in different proportions. Thus, 972 g. of pentaerythritol and 529 g. of maleic anhydride were employed to provide an OH/COOH ratio of 2.43. These ingredients were combined following the procedure of Example 1 to provide a resin having an acid value of 62. This resin was found to be water-soluble and easily dilutible with water to provide solutions of 15% solids. Films of aqueous solutions of the resin cured readily to the insoluble, infusible state at 200° C. A portion of the resin of acid value 62 was further heated to provide a resin of acid value 28. Such a resin, however, was found not to possess the desirable water solubility and dilutibility properties of the resin of acid value 62.

Example 6

One hundred fifty-three and one-half grams of glycerol and 245 g. of maleic anhydride were reacted together following the procedure described in Example 3. The OH/COOH ratio in this case was 1.00. At acid value 291 the reaction product was found to be water-soluble and easily dilutible to 15% solids with water. Such a 15% solution, in the form of films, could be easily converted to the insoluble and infusible state at 200° C. The reaction product of acid value 291 upon heating to provide a product of acid value 243 was found to have lost its desirable water solubility and dilutibility properties.

The examples have illustrated the use of various polyhydric alcohols and various mixtures of polyhydric alcohols. However, not all polyhydric alcohols are operable so far as providing the reaction products which are useful in this invention. Thus, it appears that the useful polyhydric alcohols are those having from 2 to 6 inclusive OH groups per molecule or mixtures thereof. The polyhydric alcohol employed must contain no oxygen except in the form of OH groups. Ether alcohols such as the polyethylene glycols are accordingly excluded. As has been previously stated, the OH/C ratio must be in the range of 0.6 to 1.0, inclusive. By virtue of this limitation, alcohols such as hexamethylene glycol, etc. are excluded. Taking all of the aforesaid limitations with respect to the polyhydric alcohols into account it can be seen that alcohols such as ethylene glycol, propylene glycol, glycerol, pentaerithritol, mannitol, sorbitol, etc. or their mixtures may be employed. The term "functionality" as herein applied to alcohols refers exclusively to the number of hydroxyl groups per molecule of the alcohol.

As has been explained previously, the reaction products employed in accordance with this invention must be heat-convertible, i. e., they must be convertible to the insoluble, infusible state when heated in the presence of air at a temperature below the decomposition temperature thereof.

Reaction products of the type here considered can be classified into two groups: (a) those which are reaction products of maleic acid and a dihydric alcohol as, for example, ethylene glycol, and (b) those which are reaction products of maleic acid and a polyhydric alcohol which comprises a polyhydric alcohol having a functionality greater than 2. Group (b) includes, for example, reaction products of maleic acid with glycerol, reaction products of maleic acid with a mixture of ethylene glycol and glycerol, etc. It is well known to the art that the group (a) products cannot be converted to the insoluble, infusible state solely by the mechanism of esterification. Polymerization of the double bonds of the maleic acid groups plays a dominant role in the conversion. On the other hand, the group (b) products can be formulated to convert to the insoluble, infusible state, solely by the mechanism of esterification, as well as by a combination of esterification and polymerization of the maleic acid double bonds. Both types of reaction products, if properly formulated may be converted to the insoluble, infusible form by the application of heat. Hence, such properly formulated reaction products may be said to be heat-convertible.

With respect to group (b) reaction products, it is preferred to employ such reaction products which are formulated so that they can be converted by esterification alone. Although the reaction products are so designed, the maleic double bonds can also play a part in the conversion, particularly if the conversion is carried out under conditions favorable for this reaction, such as heating in the presence of air or peroxides. As a result, reaction products so formulated convert much more quickly under milder conditions and yield harder and tougher conversion products due to a greater amount of cross-linking. Reaction products designed so that they may be converted by esterification alone can be formulated within certain limits known to the art. Thus, to obtain conversion to the insoluble, infusible state by esterification alone, a ratio of hydroxyl to carboxyl groups should be used which does not exceed the maximum limit defined by the following relationship:

$$(1) \qquad R(\max.) = \rho(f-2) + 1$$

Where R is the ratio of the number of hydroxyl to the number of carboxyl groups (actual or potential) in the initial formulation, $f$ is the number of hydroxyl groups per molecule of the alcohol having a functionality greater than 2, and $\rho$ is the ratio of the number of hydroxyl groups supplied by the alcohol having a functionality greater than the 2 to the number of hydroxyl groups in the initial formulation. In cases where a mixture of polyhydric alcohols each having a different functionality greater than 2 is used, the average molecular functionality is used for $f$. By "potential" carboxyl groups there is meant the carboxyl groups which are latent in a compound such as maleic anhydride. As illustrative of the use of the above equation, Example 1 hereof has an $f$ value of 4 and a $\rho$ value of 0.81. Hence, R (maximum) equals 2.62. It will be understood that the aforesaid equation is applicable with respect to reaction products prepared from either a mixture of a dihydric alcohol and a polyhydric alcohol having functionality greater than 2 or from only a polyhydric alcohol having a functionality greater than 2. Also, in each case, the polyhydric alcohol having a functionality greater than 2 may be made up of a mixture of polyhydric alcohols each having the same or different functionalities greater than 2. Likewise, the dihydric alcohol may consist of a mixture of dihydric alcohols.

The above equation can be derived from the principles set forth by Flory (see J. Am. Chem. Soc. 63, 3083 (1941)). Flory has shown that products such as are involved in group (b) can be converted by esterification alone if formulated so that the following relationship is satisfied.

$$\frac{P_B{}^2\rho}{R-P_B{}^2(1-\rho)} \geq \frac{1}{f-1}$$

In this equation, $P_B$ is the ratio of the number of esterified carboxyl groups to the total number of available carboxyl groups in the original formulation. In deriving Equation 1 therefrom, $P_B$ has been assigned a value of one, the maximum value which can be obtained by 100% esterification of the available carboxyl groups in the original formulation.

The useful reaction products, as has been mentioned previously, are those having at least half of the carboxyl groups (actual or potential) originally presented by the reactants esterified. Hence, the theoretical minimum value of R is 0.5, since this represents a formulation in which there is sufficient hydroxyl to esterify only half the total number of available carboxyl groups. However, an R value of 0.6 represents the practical minimum for the purposes of this invention.

It will be understood that the above-described maximum R values define only the preferred reaction products of the group (b) type which are useful in accordance with this invention. Reaction products formulated on the basis of higher R values than the above-described maxima may be heat-convertible due to the presence of the ethylenic double bonds in the maleic acid groups therein. Any such reaction products which are heat-convertible may be employed in accordance with this invention.

Turning now to reaction products of the type of the above-described group (a), i. e., reaction products of maleic acid and a dihydric alcohol, it is well known to the art that such reaction products cannot be converted to the insoluble, infusible stage solely by the mechanism of esterification. The predominant factor in the conversion of such products is polymerization of the ethylenic double bonds of the maleic acid groups contained therein. Any such reaction products which will heat-convert may be used in accordance with this invention, although it is preferred to use those reaction products formulated on the basis of an R value of from 0.6 to 1.8, and still further preferred to use those reaction products formulated on the basis of an R value of 0.9 to 1.2.

Referring to reaction products of both group (a) and group (b), as shown by the graphic relationship in this application (the figure), reaction products formulated with low R values lose the property of water-dilutability at very high acid numbers but those reaction products formulated with large excesses of alcohol retain the property of water-dilutability until the esterification is carried to comparatively low acid values. Thus, in applications where water solutions of resins with comparatively low acid numbers are needed formulations with rather high R values can be used. However, in such applications stronger conditions for advancing or converting the resins will be required as compared with resins formulated on the basis of lower R values.

Aqueous solutions of reaction products prepared from a mixture of pentaerythritol and ethylene glycol constitute a preferred embodiment of the invention. They are especially preferred due to the fact that the ultimate cured resins in the form of films, etc. evidence an exceptionally high degree of flexibility. It is still further preferred that these two alcohols be employed in such proportions that there are present from 4.0 to 4.5 chemical equivalents of pentaerythritol per chemical equivalent of ethylene glycol.

In preparing the subject reaction products various reaction temperatures can be employed, and the invention is not to be considered as limited in this respect. The preferred temperatures are from 120°–200° C., with temperatures from 145°–165° C. being most preferred. When one of the reactants is liquid at normal temperatures, the simplest procedure is to make a dispersion of the solid ingredient in the liquid and apply heat to this dispersion, as, for example, in the case of glycerol and maleic anhydride. Where neither of the reactants are liquid at normal temperatures as, for example, in the case of pentaerythritol and maleic anhydride, sufficient water can be added to provide a fluid slurry. This technique is illustrated by Example 1. On the other hand, the maleic anhydride can be first melted and the pentaerythritol slurried in the melt, as illustrated by Example 2.

The aqueous solutions of this invention will contain at least a substantial amount of water, i. e., at least sufficient water to provide a composition that is truly liquid in character. On the other hand, all of the reaction products described herein can be dissolved in water and diluted therewith at least to the extent of providing solutions of 15% solids. Certain of the reaction products, particularly those having substantially higher acid values than the minimum values defined by line AB of the figure, can be diluted still further without encountering precipitation. Aqueous solutions having a reaction product concentration of from about 2% to about 75% have been found most useful for most applications.

It has been mentioned heretofore that a unique characteristic of the instant reaction products or resins lies in the fact that they do not require alkaline solubilizing agents such as ammonium hydroxide to take them in solution in water. While this is true, it is also true that the use of small amounts of alkaline solubilizing agents is not precluded if for any reason their use may be especially beneficial in a given case. For example, a small amount of ammonia water is a useful additive to the aqueous solutions of this invention for the purpose of neutralization thereof. Neutralization may be necessary when the aqueous solution is to be used in conjunction with an emulsion which is unstable at lower pH values than 7.0. Furthermore, in the case of aqueous solutions which will stand dilution to 15% solids but no more, a small amount of ammonia will provide somewhat further dilutability.

The aqueous solutions of this invention can be used per se as coating, impregnating, sizing, or bonding compositions. However, they may also be used in conjunction with other water-soluble film-formers as, for example, water-soluble glues such as animal glue, fish glue, etc., water-soluble cellulose derivatives such as sodium carboxymethylcellulose, methyl cellulose, etc., water-soluble gums such as gum arabic, tragacanth, etc., etc. Additional possible components include water-soluble dyes and water-dispersible pigments.

By varying the ratio of the number of hydroxyl to the number of carboxyl groups in the initial formulation not only the water-solubility and dilutability of the resins or incipient resins used in this invention can be altered, but also the speed and ease with which the resins are heat-converted to the insoluble, infusible state can be varied. Thus, compositions useful under a variety of operating conditions can be prepared. In applications such as paper coating or impregnating, where mild conditions for advancing the resins should be employed, the resins can be formulated in such a way that conversion to the insoluble, infusible state takes place readily under mild temperature conditions such as 130°-150° C. In applications where more vigorous conditions can be employed the resins can be formulated with higher proportions of alcohol to maleic acid. Such resins have the advantage of remaining water-soluble at comparatively low acid numbers. Resins of this type may be used in the form of their aqueous solutions as sizing and bonding agents for glass wool in which application temperatures above 200° C. can be used in the conversion.

The speed of cure or conversion of these resins is in general sufficiently fast that the use of catalysts to accelerate the rate of cure is not necessary. Such catalysts may, however, be employed if desired. Thus, for example, peroxide catalysts such as benzoyl peroxide, etc. may be employed to accelerate the rate of cure as may oxidation catalysts of the metal drier type such as cobalt acetate, cobalt nitrate, etc.

The compositions of this invention have been found particularly useful as binders for glass wool fibers in the manufacture of insulating bats. Dilute aqueous solutions of the desired reaction product (resin) are applied to the glass fibers. The resin is subsequently heat-converted to an insoluble, infusible water-resistant state. This application takes advantage of several properties of the subject aqueous solutions. In view of the fact that they can be diluted to low concentrations they may be easily applied by spray application. The cost is low due to the fact that solutions of very low concentrations of resin do an effective job of binding the wool fibers. The resulting glass fiber bats possess good water resistance and excellent flexibility.

Among other uses of the subject aqueous solutions the following may be mentioned. They may be used as sizing materials for glass cloth and yarn to prevent fraying. They may also be used as binders for abrasives. Another use lies in the manufacture of plywood and other laminated structures. These aqueous solutions may also be used in the manufacture of brake linings in which use the ultimate resin functions as a binder.

Where in the specification and claims reference is made to acid value, it will be understood that the phenol red method for determining acid value is meant. This method involves the following steps. Dissolve to 5 g. of solid resin in about 20 cc. of a 4:1 acetone:ethyl alcohol solution previously neutralized to a phenol red end point. Titrate the resulting solution with 0.3 N alcoholic potassium hydroxide to a pink end point which is stable for at least 30 seconds. If the solution becomes cloudy during titration, the addition of a few cc. of water will clear it.

All parts and percentages in the specification and claims are by weight unless otherwise indicated.

What I claim and desire to protect by Letters Patent is:

1. A composition suitable for coating and impregnating applications comprising an aqueous solution of a heat-convertible reaction product of a polyhydric alcohol and an $\alpha,\beta$-unsaturated dicarboxylic acid, said polyhydric alcohol being selected from the class consisting of polyhydric alcohols of from 2 to 6 hydroxyl groups per molecule and mixtures thereof, said polyhydric alcohol containing no functional groups other than OH groups, containing no oxygen except in the form of OH groups and having an OH/C ratio of from 0.6 to 1.0, said $\alpha,\beta$-unsaturated dicarboxylic acid being selected from the class consisting of maleic acid and maleic anhydride, said reaction product being one having at least half of the COOH groups originally presented by the reactants esterified as evidenced by the acid value of the reaction product but at the same time having an acid value of at least the minimum value for the particular OH/COOH ratio employed as defined by line AB of the figure, said reaction product being soluble in water without the aid of any alkaline solubilizing agent, said composition combining the properties of dilutability with water to at least 15% concentration of the reaction product in water and the ability to provide insoluble, infusible films by heat-conversion.

2. The composition of claim 1 wherein pentaerythritol is employed as the polyhydric alcohol.

3. The composition of claim 2 wherein maleic anhydride is employed as the $\alpha,\beta$-unsaturated dicarboxylic acid.

4. The composition of claim 1 wherein the polyhydric alcohol is a mixture of pentaerythritol and ethylene glycol.

5. The composition of claim 4 wherein the $\alpha,\beta$-unsaturated dicarboxylic acid is maleic anhydride.

6. The composition of claim 5 wherein from 4.0 to 4.5 chemical equivalents of pentaerythritol per chemical equivalent of ethylene glycol are employed.

7. The composition of claim 6 wherein the OH/COOH ratio of the reactants employed is about 2.6.

8. The composition of claim 1 wherein glycerol is employed as the polyhydric alcohol.

9. The composition of claim 8 wherein maleic anhydride is employed as the $\alpha,\beta$-unsaturated dicarboxylic acid.

10. The composition of claim 1 wherein maleic anhydride is employed as the $\alpha,\beta$-unsaturated dicarboxylic acid.

JOSEPH WAYNE KNEISLEY.

References Cited in the file of this patent

UNITED STATES PATENTS

| Number | Name | Date |
|---|---|---|
| 2,166,542 | Bradley | July 18, 1939 |
| 2,386,144 | Rust | Oct. 2, 1945 |
| 2,524,921 | Minter | Oct. 10, 1950 |

OTHER REFERENCES

Kropa et al.: Ind. & Eng. Chem., Dec. 1939, pp. 1512–1516.

Drinberg et al.: J. Applied Chem. (USSR) 13, 1940, pp. 1442–48, abstracted in Chem. Abs. 35, June 1941, p. 3970.